United States Patent

[11] 3,567,867

[72] Inventors Charles F. Rice
Miami Shores;
Charles Kimtantas, Miami Springs, Fla.

[21] Appl. No. 862,188
[22] Filed Sept. 30, 1969
[45] Patented Mar. 2, 1971
[73] Assignee said Rice, assignor to Rice International Corporation
Continuation-in-part of application Ser. No. 572,045, Aug. 12, 1966, now Patent No. 3,470,322.

[54] SUPERVISORY LAMP SYSTEM FOR TELEPHONE CONFERENCE CONNECTION AND CALL TRANSFER DEVICES
6 Claims, 2 Drawing Figs.

Figure 1:
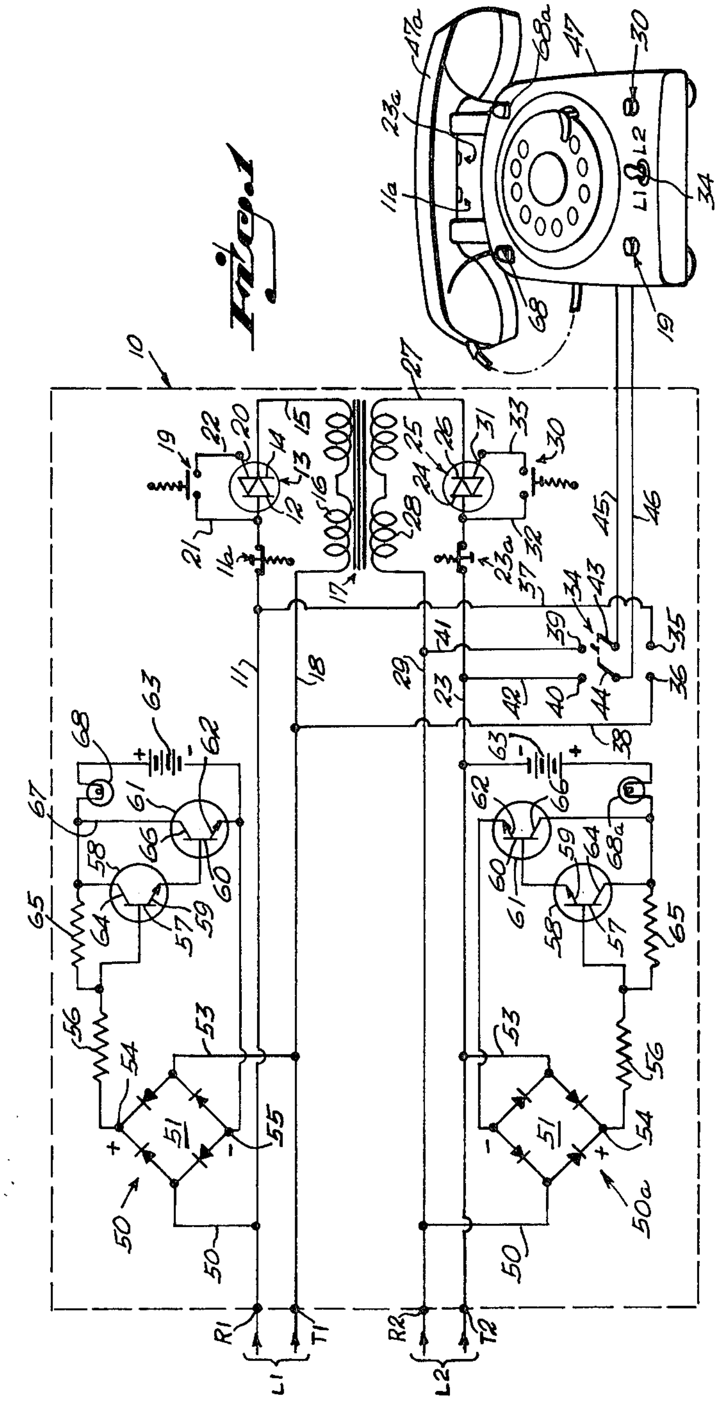

[52] U.S. Cl. ........ 179/81, 179/18, 307/252, 179/84L
[51] Int. Cl. ........ H04m 3/42
[50] Field of Search ........ 179/81 (C)

[56] References Cited

UNITED STATES PATENTS

| | | | |
|---|---|---|---|
| 3,412,213 | 11/1968 | McCay | 179/81 |
| 3,470,322 | 9/1969 | Rice et al. | 179/1 |

*Primary Examiner*—Kathleen H. Claffy
*Assistant Examiner*—Jan S. Black
*Attorney*—Ernest H. Schmidt ABSTRACT: A supervisory lamp system for use in conjunction with a conference connection and call transfer device for effecting call transfer or conference connection between two or more mutually remote telephone subscribers at a subscriber station having a plurality of telephone circuit subscriber lines is described. Connection of or "seizing" of any of the interconnected lines is signalled by the lighting of an associated supervisory lamp at the controlling subscriber station, which supervisory lamp automatically goes out upon disconnect effected by "hanging up" of the associated remote subscriber set. When setting up conference connection between two or more remote subscriber stations without monitoring at the controlling subscriber station, accidental actuation of disconnect switches at the controlling station is prevented by having said switches arranged within the cradle of the controlling subscriber desk set in such a manner that when the handset portion is placed upon the cradle, said switches are protectively covered.

PATENTED MAR 2 1971

3,567,867

INVENTORS.
CHARLES F. RICE
CHARLES KIMTANTAS

BY [signature]

ATTORNEY.

SUPERVISORY LAMP SYSTEM FOR TELEPHONE CONFERENCE CONNECTION AND CALL TRANSFER DEVICES

This invention is a continuation-in-part of our invention titled COMBINATION CONFERENCE CONNECTION AND CALL TRANSFER DEVICE FOR TELEPHONE SUBSCRIBER LINES, filed Aug. 12, 1966, Ser. No. 572,045, issued Sept. 30, 1969 as U.S. Pat. No. 3,470,322. In that patent, there is described electronic circuitry comprising a conference connection and control device that enables a subscriber at the controlling subscriber telephone station to make successive outgoing calls to persons at a plurality of mutually remote stations to bring them to conference connection with him, or, alternatively, only with one another. In the operation of that device, hanging up of the handset of a "seized" remote subscriber in conference connection or in call transfer connection with another remote subscriber will free the line for subsequent use. If a remote subscriber fails to "hang up," pushbutton switch means is provided at the controlling subscriber telephone station to effect freeing of the line. However, whether or not one or more of the remote subscriber lines remains "seized" after completion of a conference call can only be determined by listening in on that line. In instances where the controlling station is used as a call transfer station and is not being monitored, it becomes necessary for the operator thereof to periodically "listen in" to determine if the transferred call is completed, or, as may be necessary occasionally, to "listen in" to determine if one or more of the remote subscribers in call transfer connections has inadvertently left the handset portion off his desk set, thereby tying up the line and preventing its further use until cleared.

It is, accordingly, the principal object of this invention to provide a supervisory lamp system for telephone conference and call transfer devices of the character described which will visually inform the operator at the controlling station when a remote line becomes "seized" and when, upon completion of the call thereafter, it has been released by a remote subscriber placing his handset portion upon the desk set cradle.

Another object of the invention is to provide a mechanical interlock means at the controlling telephone station operative when the controlling station is being used only as a call transfer station for two or more interconnected remote telephone subscriber stations, to prevent accidental disconnect by inadvertent pushing upon one or more of the disconnect switches at the controlling station. To this end, the disconnect pushbutton switches are so placed within the cradle of the controlling desk set that when the handset portion is in place in the cradle, said switches will be protectively covered against accidental actuation.

It is still another object of this invention to provide a supervisory lamp system of the character described which will be operative no matter what the polarity or voltage system of the line being supervised.

Another object is to provide a supervisory lamp system of the character described which will be compact, simple to install and operate, and dependable and durable in use.

Figure 2:
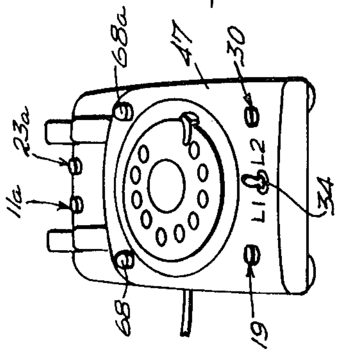

Other objects, features and advantages of the invention will be apparent from the following description when read with reference to the accompanying drawings. In the drawings, wherein like reference numerals denote corresponding parts in each of the two illustrative views:

FIG. 1 is a schematic diagram of a combination conference connection and call transfer device including the supervisory lamp system embodying the present invention; and FIG. 2 illustrates the controlling telephone subscriber desk set equipment with the headset portion removed to show the location of the disconnect switches.

Referring now in detail to FIG. 1 of the drawings, the broken line box indicated at 10 encompasses the internal circuitry, shown schematically, of our signalling device shown in use in conjunction with a conference connection and call transfer device of the type illustrated and described in the above-identified U.S. Pat. No. 3,470,322, the same having a plurality (two in the embodiment illustrated) of ring and tip line pairs R1, T1 and R2, T2, respectively, externally connected, correspondingly, to the ring and tip leads of telephone subscriber lines L1 and L2 available for conference or call transfer connection at the controlling subscriber station. Line ring terminal R1 of line L1 is connected, as by conductor 11, through normally closed pushbutton switch 11*a* to the main terminal 2, designated by reference numeral 12 of a bidirectional triode switch (silicon controlled rectifier) 13. The main terminal 1, designated by reference numeral 14 of the switch 13 is connected, as by conductor 15, to one terminal of one winding 16 of a telephone repeat coil or transformer 17 having two coils of one-to-one turns ratio. The other terminal of repeat coil winding 16 is connected, as by conductor 18, to remaining terminal T1 of telephone line L1. A normally open, momentary contact pushbutton switch 19 is connected across main terminal 2, designed by reference numeral 12 and trigger or gate element 20 of the bidirectional triode 13 as by conductors 21, 22.

Line tip terminal T2 is connected, as by conductor 23, through normally closed pushbutton switch 23*a* to the main terminal 2, designated by reference numeral 24 of a second bidirectional triode switch 25. The main terminal 1, designated by reference numeral 26 of the switch 25 is connected, as by conductor 27, to one terminal of the second winding 28 of the telephone repeat transformer 17. The remaining terminal of repeat coil winding 28 is connected, as by conductor 29, to remaining terminal R2 of telephone line L2. A normally open, momentary contact pushbutton switch 30 is connected across main terminal 24 and trigger or gate element 31 of the bidirectional triode 32 as by conductors 32, 33.

Means is provided for switching a telephone set for selective connection to either one or the other of the two telephone subscriber lines L1 and L2 at the controlling subscriber station. To this end, a double-pole, double-throw switch 32 is provided. Fixed switch contacts 35, 36 of the switch 32 are connected, as by conductors 37, 38, to terminals R1 and T1, respectively, of L1, and fixed switch contacts 39, 40 of said switch are connected, as by conductors 41, 42, to terminals R2 and T3, respectively, of line L2. Movable switch arms 43, 44 of the double-pole double-throw switch 34 are connected to the input terminals 45, 46 of an ordinary telephone set 47. It will be understood that when the ganged moveable switch arms 43, 44 are moved into contact with fixed switch contact pair 35, 36, the telephone set 47 will be connected across line L1 through conductors 37, 38; and that when said switch arms are moved into contact with fixed switch contact pair 39, 40, the telephone set will be connected across line L2 through conductors 41, 42.

Considering now the circuitry of the associated supervisory lamp device comprising the present invention, designated generally by reference numerals 50 and 50*a* for subscriber lines L1 and L2, respectively, and referring in detail, by way of example since each are the same, to the circuitry indicated by said reference numeral 50, the same comprises a diode bridge-type full-wave rectifier 51, the input of which is connected across line L1 by conductors 52 and 53 and the output of which appears as a DC voltage at bridge terminal points 54 and 55. The positive voltage output appearing at bridge terminal point 54 connects through current limiting-bias resistor 56 to the base element 57 of a first transistor 58, the emitter 59 of which is connected to the base 60 of a second transistor 61 connected in a so-called "Darlington" circuit with the first transistor 58. The emitter element 62 of the second transistor 61 is returned both to the negative bridge terminal point 55 and to the negative terminal of an output load battery 63. The collector element 64 of the first transistor 58 connects with the base element 57 of said transistor through a bias resistor 65, and is also connected directly to the collector element 66 of the second transistor 61 through a conductor 67. The positive terminal of the battery 63 connects through a supervisory lamp 68 to the collector element 66 of the second transistor 61, said supervisory lamp serving as the load for said second transistor. In operation, the values of the bias resistors 56 and 65 associated with the first or input transistor 58 are so chosen that said transistor will be in its cutoff range when a voltage greater than about 20 volts appears across the bridge terminal points 54, 55, the usual potential range appearing across an open or "unseized" telephone subscriber line. Upon the line being placed in use or becoming "seized," the line potential characteristically drops to about 5 volts. The resulting decrease in bias operative on the first transistor 58 changes its nonconductive state to one of conductance which, in turn, induces conductance in the second transistor 61. Conductance in the second transistor 61 permits current flow from the battery 63 through the load represented by the supervisory signal lamp 68, illuminating said lamp as a direct consequence of the placing into operation or "seizing" of subscriber line L1. The bias resistors 56 and 65 will be of high enough values to present such a high impedance looking into the telephone line with which it is interconnected as will substantially eliminate any possibility of unbalancing the line. The load battery 63, while illustrated herein as comprising a battery, could alternatively be in the form of a rectifier energized by the household electrical source of supply and furnishing a reduced DC voltage of about 18 volts.

The circuitry, which includes only a few small components, is preferably housed within the base structure of the telephone set 47, with the pushbuttons 19, 30, the supervisory lamps 68, 68*a*, and the double-pole double-throw switch 34 mounted in the face panel thereof. As is best illustrated in FIG. 2, the disconnect switches 11*a*, 23*a* associated with respective lines 11 and 23 are mounted in that portion of the telephone housing between the cradle ends so as to be covered, but not depressed or actuated, when the telephone equipment handset portion 47*a* is placed on the cradle. With this arrangement it will be practically impossible to accidentally actuate said disconnect switches under conditions when the controlling telephone station is being used for call transfer only, as hereinbelow more particularly described, and is not being monitored. The operation of the supervisory lamps 68, 68*a* comprising the present invention serves to notify the operator at the controlling telephone station whether or not the interconnected or call-transfer lines are in use without the necessity of having to monitor or "listen in" from time to time.

Considering now the operation of the invention as a conference connection device, the telephone 47 will be employed in the ordinary fashion to make a call to the first remote station to be called into conference, through line L1, for example, the line switch 34 first being thrown to L1 position to establish a direct connection between said line and the telephone set. At this time, the bidirectional triode switch 13 will be in open-circuit condition, permitting no current to flow through the repeat transformer coil 16 in series with said bidirectional triode switch, the normally closed switch 11*a* and telephone subscriber line L1. When the first-called subscriber answers, he will be told to wait while the second subscriber is called into conference connection. Upon the first-called subscriber answering, his line will become "seized" thereby illuminating the associated supervisory signal lamp 68 as above described. Before switching line switch 34 to the second line at the controlling station, pushbutton 19 associated with telephone line L1 will be depressed to apply a trigger voltage (DC talk voltage from the telephone line L1) to the bidirectional triode switch 13. This voltage, which can be of either polarity because of the bidirectional nature of the triode switch 13, will, in effect, close-circuit the device so that telephone line current of line L1 will flow from one conductor of the line through conductor 11, normally closed pushbutton switch 11*a*, switch 13 and repeat transformer winding 16 through conductor 18 to the other conductor of the line L1. The transformer winding 16 reflects an impedance which substantially matches that of a subscriber line, with or without the usual telephone handset equipment connected in parallel therewith, so that the called line can be held or will remain "-seized" while the person at the controlling station makes the second call through line L2 to bring the second remote subscriber into conference connection, after first having switched the line switch 34 to closed-circuit position with respect subscriber line L2. At this point in time, upon the second line L2 becoming "seized," the associated supervisory lamp 68*a* will light to signal such interconnection of the line. It will be noted that since the bidirectional triode switch 25 will normally be in open-circuit condition, no talking current will flow through the second winding 28 of the repeat transformer 17, and, consequently, the controlling party can talk in privacy with the second remote party called. To effect conference connection, it is only necessary now for the controlling subscriber to depress the pushbutton switch 30 momentarily, whereupon, as detailed above in connection with the circuitry directly associated with line L1, talking current will now flow through said second winding to repeat in winding 16 to be heard by the remote subscriber being held on line L1 by virtue of said line being connected across said winding 16. Thus, all three parties can converse with one another in conference connection, irrespective of the polarities or mutual polarities of the two lines being interconnected in conference connection, the bidirectional triode switches being capable of being actuated by trigger voltages of either polarity, if direct current, and by alternating currents, and being capable of passing voice frequency alternating currents with no appreciable attenuation when in closed-circuit actuated condition.

While the invention is illustrated and described herein as operating with two remote subscriber's lines for bringing two remote parties in conference connection with the controlling subscriber, it will be understood that the device could also be used with three or more lines at the controlling station for bringing into conference a like number of remote subscribers simply by using an additional winding on the repeat transformer for each additional line, together with associated bidirectional triode switch circuitry and supervisory lamp circuitry as described above.

It is to be noted that instead of the subscriber at the controlled station initiating the conference connection by first calling out through one of the lines, an incoming call could as well effect the first step in conference connection. Further, instead of setting up conference connection, an incoming call can be transferred to a remote party through the second line without even conversing with the calling party, it only being necessary for the operator at the controlling subscriber station to dial out through the second line to the remote station where the party being called is known or thought to be, while holding the incoming call line, and then, after establishing that the called party is on the second line, effecting interconnection by pushing pushbutton switch 30, for example, if the party called is on line L2. At this point, the circuitry is set up in conference connection, but since conference was not the purpose of the incoming call, the operator will merely hang up his receiver, leaving the two parties at the two remote stations to carry out their conversation in privacy and, if desired, without the first party calling in even being aware that the called party is not at the location of his subscriber line, but may be at any other subscriber station in the telephone system.

It will be noted that when either remote line is in use or "seized" after a call having been received or made at the controlling station, and after having actuated the associated triggering pushbutton switch 19 or 30, the line will ordinarily remain seized and in conference connection until the person at the remote station hangs up. Upon hanging up, deactuation of the associated bidirectional triode switch is effected by polarity reversal of line potential, or momentary open circuiting of the line at the telephone equipment office (bringing line potential to zero momentarily) depending upon what system of telephone circuitry is employed in association with the subscriber lines. In either case, potential across the associated bidirectional switch is brought through zero to open-circuit the switch. At the same time, the associated supervisory lamp will become extinguished, visually signalling at the controlling telephone station that the call, at least with respect to that remote subscriber, has been completed. If the other of the remote subscribers wishes to talk with the operator at the controlling telephone station, he will not hang up, leaving his supervisory lamp illuminated as a signal to the operator that he wishes now to talk with him privately.

It will be understood that in order to prevent tying up a line by a remote party inadvertently leaving the telephone handset off its cradle, and in order to disconnect a seized line from conference connection if brought into conference connection by accidentally depressing its associated triggering circuit switch, disconnect switches 11*a* and 23*a* are provided in series with the line control circuitry. Upon pressing either of said switch buttons, potential across its associated bidirectional switch is brought to zero, whereupon it will become deactivated or open-circuited again, and the associated supervisory lamp will become extinguished as described above.

We claim:

1. In a supervisory lamp system for a combination telephone conference connection and call transfer device for use at a telephone subscriber station having a plurality of subscriber lines thereto from a telephone system exchange, and a telephone set equipment, the combination comprising, transformer means for inductively coupling said subscriber lines and having a plurality of electrical windings, one for each of said subscriber lines, circuit means for each of said subscriber lines for interconnecting said subscriber lines in series with one each of said plurality of windings, normally nonconductive solid state switch means having first and second main terminal elements in series with each of said circuit means and having a gate terminal element responsive to potential applied to said gate terminal element with respect to said second main terminal element for rendering said switch means conductive when a potential appears across said first and second main terminal elements, said switch means including means rendering it nonconductive upon a potential across said first and second main terminal elements falling either to or through zero potential, a normally deenergized supervisory lamp for each of said plurality of subscriber lines, and circuit means interconnecting said supervisory lamps with one each of said subscriber lines operative to energize the associated lamp upon its subscriber line becoming seized.

2. A supervisory lamp system for a combination telephone conference connection and call transfer device as defined in claim 1 including a normally open, manually operated electrical switch connected across said second main terminal and gate terminal elements of each of said switch means for applying associated line potential thereacross for rendering said switch means conductive.

3. a supervisory lamp system for a combination telephone conference connection and call transfer device as defined in claim 2 wherein the telephone subscriber station is of the desk set type and including a normally closed, manually operated electrical switch connected in series with one each of said circuit means for rendering said switch means nonconductive, said switches being arranged between the cradle ends of the subscriber station desk set portion so as to be inaccessible upon the handset portion being set in place on said cradle.

4. A supervisory lamp system for a combination telephone conference connection and call transfer device as defined in claim 3 wherein said normally open and normally closed manually operated switches are momentarily actuated pushbutton switches.

5. A supervisory lamp system for a combination telephone conference connection and call transfer device as defined in claim 4 wherein said circuit means comprises a full-wave rectifier connected across one of said lines, a first transistor biased by the output of said full-wave rectifier, a second transistor controlled by the output of said first transistor to normally maintain said second transistor in its cutoff state, and an output circuit including a DC load voltage for said second transistor, the associated one of said supervisory lamps being connected in series as the load in said output circuit.

6. A supervisory lamp system for a combination telephone conference connection and call transfer device as defined in claim 5 wherein said supervisory lamps and said normally open switches are mounted in the face panel of said subscriber desk set portion.